US009323535B2

(12) United States Patent
Dixon et al.

(10) Patent No.: US 9,323,535 B2
(45) Date of Patent: Apr. 26, 2016

(54) INSTRUCTION ORDER ENFORCEMENT PAIRS OF INSTRUCTIONS, PROCESSORS, METHODS, AND SYSTEMS

(71) Applicant: Intel Corporation, Santa Clara, CA (US)

(72) Inventors: Martin Guy Dixon, Portland, OR (US); William C. Rash, Saratoga, CA (US); Yazmin A. Santiago, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 13/931,544

(22) Filed: Jun. 28, 2013

(65) Prior Publication Data

US 2015/0006851 A1  Jan. 1, 2015

(51) Int. Cl.
*G06F 9/38* (2006.01)
(52) U.S. Cl.
CPC ............ *G06F 9/3836* (2013.01); *G06F 9/3855* (2013.01)
(58) Field of Classification Search
None
See application file for complete search history.

(56) References Cited

U.S. PATENT DOCUMENTS

| | | | |
|---|---|---|---|
| 5,941,983 A * | 8/1999 | Gupta | G06F 9/3836 712/214 |
| 6,880,073 B2 | 4/2005 | Arimilli et al. | |
| 7,426,612 B2 | 9/2008 | Rudd | |
| 2005/0066151 A1* | 3/2005 | Kottapalli | G06F 9/30072 712/226 |
| 2008/0263337 A1 | 10/2008 | McKenney | |
| 2012/0173848 A1 | 7/2012 | Sun et al. | |

FOREIGN PATENT DOCUMENTS

WO     2014/209627 A1    12/2014

OTHER PUBLICATIONS

International Search Report and Written Opinion received for PCT Patent Application No. PCT/US2014/042153, mailed on Sep. 30, 2014, 10 pages.
Office Action received for Taiwan Patent Application No. 103121587, mailed on Jul. 3, 2015, 2 pages of Taiwan Office Action only.

* cited by examiner

*Primary Examiner* — Kris Rhu
(74) *Attorney, Agent, or Firm* — Vecchia Patent Agent, LLC

(57) ABSTRACT

A processor of an aspect includes an instruction fetch unit to fetch a pair of instruction order enforcement instructions. The pair of instruction order enforcement instructions are part of an instruction set of the processor. The pair of instruction order enforcement instructions includes an activation instruction and an enforcement instruction. The activation instruction is to occur before the enforcement instruction in a program order. The processor also includes an instruction order enforcement module. The instruction order enforcement module, in response to the pair of the instruction order enforcement instructions, is to prevent instructions occurring after the enforcement instruction in the program order, from being processed prior to the activation instruction, in an out-of-order portion of the processor. Other processors are also disclosed, as are various methods, systems, and instructions.

24 Claims, 14 Drawing Sheets

METHOD IN
PROCESSOR
226

RECEIVE PAIR OF INSTRUCTION ORDER ENFORCEMENT INSTRUCTIONS, WHICH ARE PART OF INSTRUCTION SET OF PROCESSOR, PAIR OF INSTRUCTIONS INCLUDING ACTIVATION INSTRUCTION AND ENFORCEMENT INSTRUCTION, ACTIVATION INSTRUCTION OCCURRING BEFORE ENFORCEMENT INSTRUCTION IN PROGRAM ORDER ⎯227

IN RESPONSE TO PAIR OF INSTRUCTIONS, PREVENT INSTRUCTIONS OCCURRING AFTER ENFORCEMENT INSTRUCTION IN PROGRAM ORDER, FROM BEING PROCESSED PRIOR TO ACTIVATION INSTRUCTION, IN OUT-OF-ORDER PORTION OF PROCESSOR ⎯228

FIG. 2

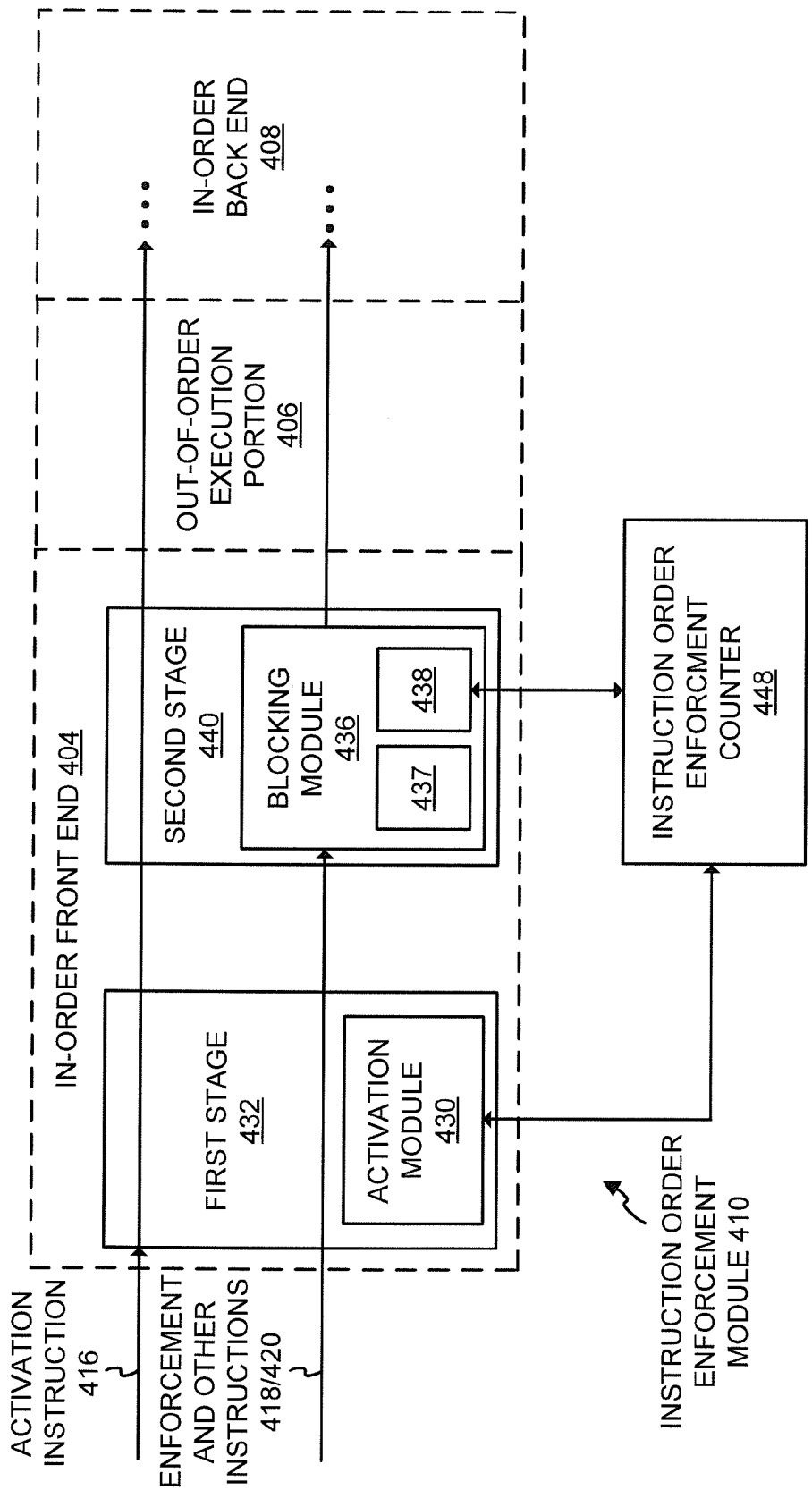

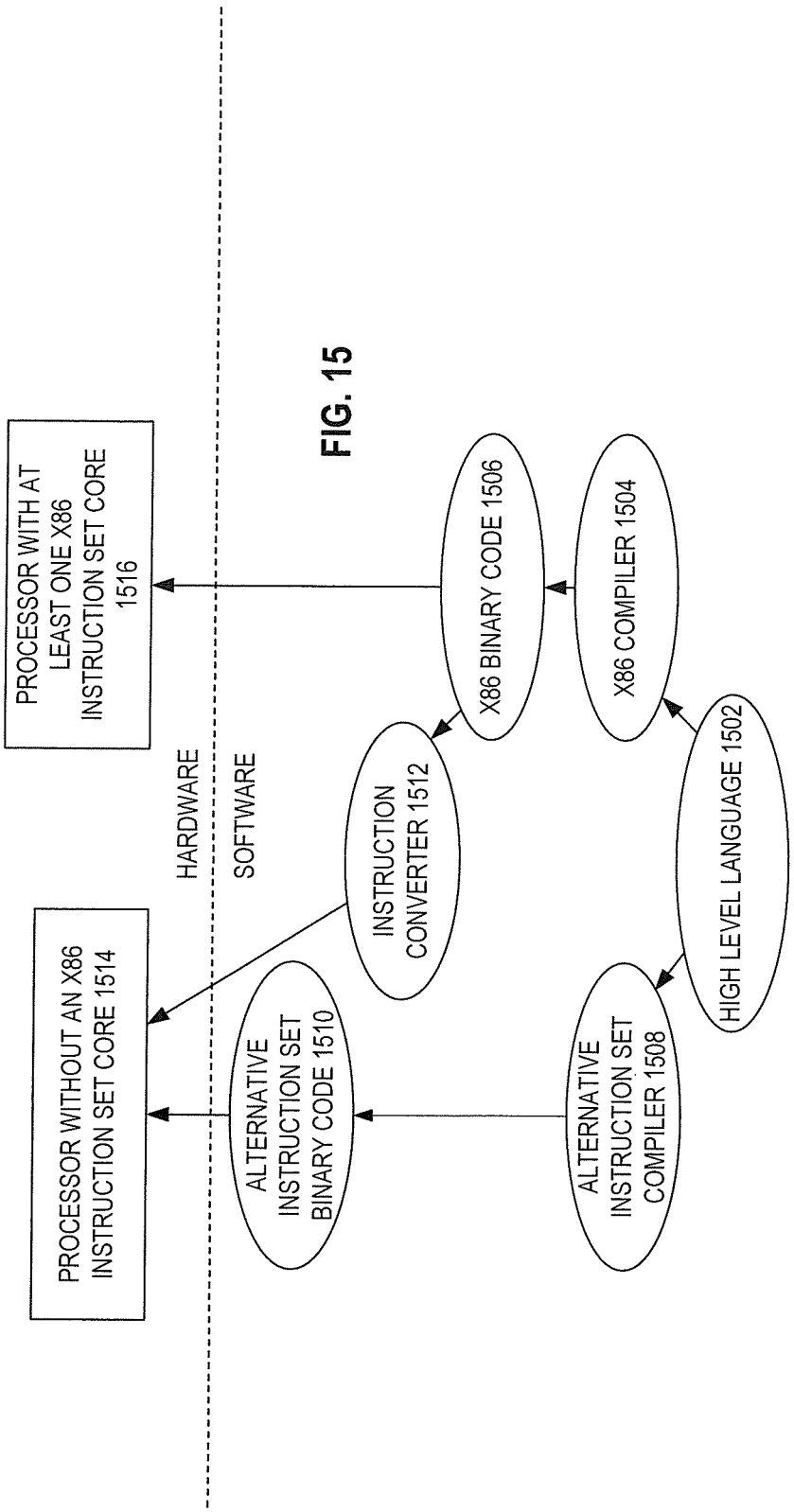

INSTRUCTION ORDER ENFORCEMENT PAIRS OF INSTRUCTIONS, PROCESSORS, METHODS, AND SYSTEMS

BACKGROUND

1. Technical Field

Embodiments described herein generally relate to processors. In particular, embodiments described herein generally relate to enforcing instruction order in out-of-order execution processors.

2. Background Information

Many modern processors are out-of-order (OoO) execution processors that are capable of executing instructions in an order that is different than the order in which the instructions appear the original software program. The term program order is often used to refer to the order of the instructions in the original software program. Instead of necessarily executing the instructions in the program order, the OoO execution processor may execute the instructions in an order that may depends on the availability of input data, as well as potentially various other factors. By way of example, some younger instructions may need input data from older instructions, while other younger instructions may not need input data from any older instructions.

OoO execution may allow the processor to immediately execute instructions that are ready without delay waiting on prior instructions that may themselves be unready to execute because they are waiting on data. The order in which the instructions are actually executed in the OoO execution processor is often referred to as data order. Subsequently, the OoO execution processor may re-order the execution results and/or architectural state and present the execution results and/or architectural state (e.g., to software, a user, etc.) in the original program order instead of in the data order in which the instructions were actually executed. Advantageously, such OoO execution processors generally have improved performance and/or speed due in part to increased utilization of pipeline stages or processing timeslots.

However, one challenge in OoO execution processors in certain situations is that problems may occur when a resource that should only be accessed in program order is accessed in data order as a result of out-of-order execution.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method in a processor of processing or performing an embodiment of a pair of instruction order enforcement instructions.

FIG. 4 is a block diagram of a second example embodiment of a suitable instruction order enforcement module.

FIG. 15 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are instruction order enforcement pairs of instructions, processors to process or perform the pairs of instructions, methods performed by the processors when processing or performing the pairs of instructions, and systems incorporating one or more processors to process or perform the pairs of instructions. In the following description, numerous specific details are set forth (e.g., specific instruction functionalities, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
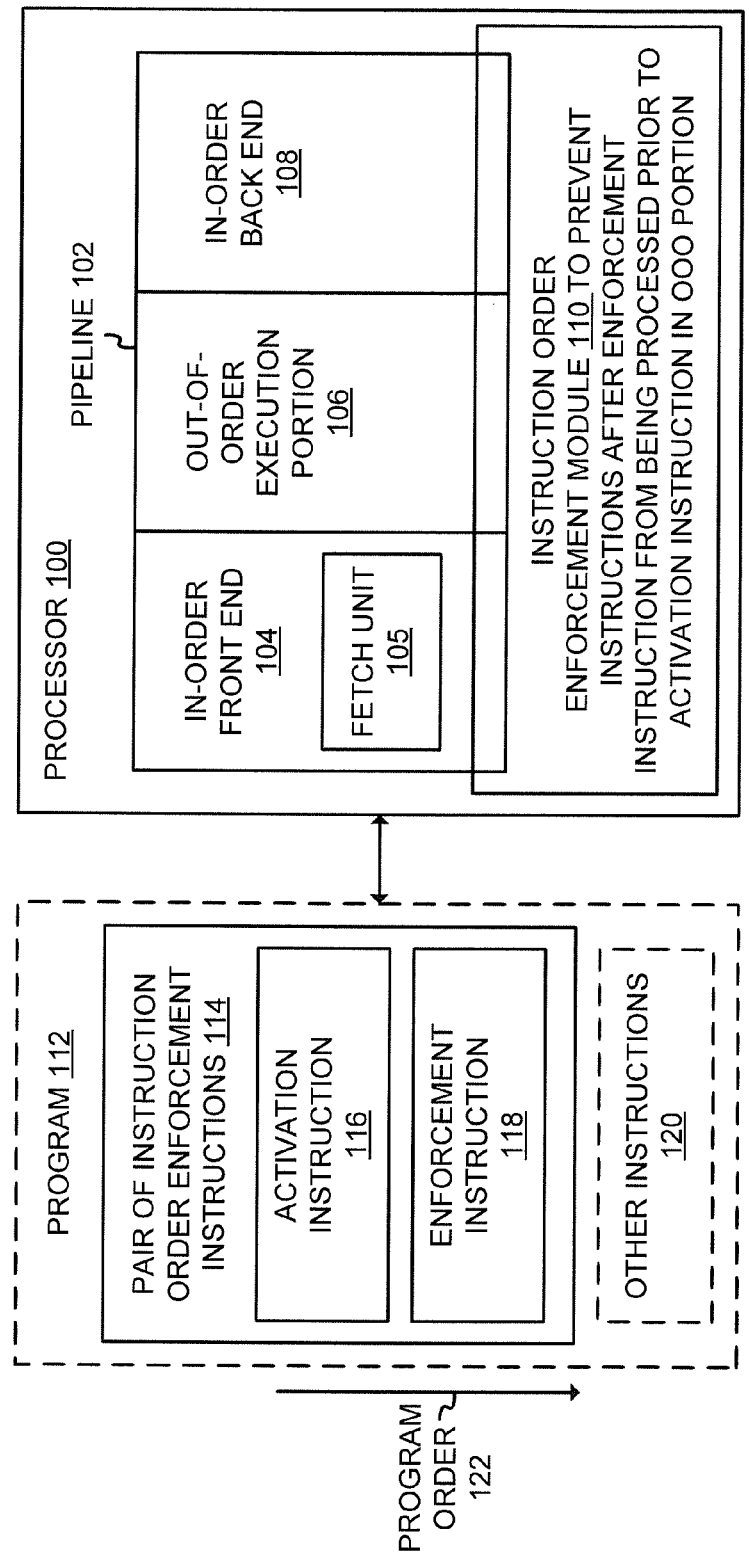
FIG. 1 is a block diagram of an embodiment of a processor that is operable to process or perform a pair of instruction order enforcement instructions.

FIG. 1 is a block diagram of an embodiment of a processor 100 that is operable to process or perform a pair of instruction order enforcement instructions 114. In some embodiments, the processor 100 may be a general-purpose processor (e.g., a central processing unit (CPU) or other general-purpose microprocessor or of the type used in desktop, laptop, tablet, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors entirely.

A program 112 is also shown. By way of example, the program may be stored in main memory, or another suitable storage device. During operation, the program may be run, executed, or otherwise performed by the processor. The processor may fetch or otherwise receive instructions of the program. In some embodiments, the instructions of the program may be part of an instruction set of the processor. The instructions of the instruction set may represent relatively higher-level macroinstructions, assembly language instructions, machine-level instructions, or control signals at the instruction set level, which may be provided to the processor for execution, as opposed to relatively lower-level microinstructions, micro-operations, or other instructions or control signals decoded by the processor from the relatively higher-level instructions.

In some embodiments, the processor may represent an out-of-order (OoO) execution processor 100 that is operable to execute instructions out-of-order. OoO execution processors were discussed above in the background section. The OoO execution processor has an OoO execution pipeline 102. The pipeline includes an in-order front end 104, an out-of-order execution portion 106, and an in-order back end 108. The particular units or constituents of these pipeline phases may vary from one implementation to another. In one representative embodiment, the in-order front end may include an instruction fetch unit or stage (e.g., fetch unit 105), a length decoding unit or stage, a decode unit or stage, an allocation unit or stage, a renaming unit or stage. In one representative embodiment, the out-of-order execution portion may include a scheduler unit or stage (sometimes also referred to as dispatch or issue), a register file(s) units and memory unit or register read/memory read stage, an execution unit(s) or stage, a register file(s) units and memory unit or write back/memory write stage. In one representative embodiment, the in-order back end may include an exception handling stage and a retirement or commit unit or stage. This is just one particular example and it is to be appreciated that the scope of the invention is not limited to this particular example. Other embodiments may use other combinations and configurations of units and/or pipeline stages. Any combinations or configuration of unit and/or pipeline stages known in the arts for OoO execution processors should generally be suitable.

One challenge in OoO execution processors is that it is occasionally important or at least useful to maintain certain instructions in original program order even within the OoO execution portion 106 of the processor. By way of example, this may be the case if a memory location, mapped input-output value, or other resource should only be updated or otherwise accessed in the original program order. Representatively, if the memory location is updated in data order instead of program order, then an error may occur (e.g., a write of an older/prior instruction may update a write of a newer instruction executed out-of-order around the older/prior instruction). Such an error may cause values to be different than and inconsistent with the intentions of the original program. More generally, this may be the case in any of various possible situations in which an incorrect or inconsistent result could occur, or some other problem could occur, if the instructions are executed OoO and/or in data order instead of in-order and/or in program order.

Referring again to FIG. 1, the program includes a pair of instruction order enforcement instructions 114. The pair of instruction order enforcement instructions includes an activation instruction 116 and an enforcement instruction 118. In some embodiments, the activation instruction may be operable to cause or result in the processor activating instruction order enforcement, and the enforcement instruction may be operable to cause or result in the processor enforcing the instruction order. The program also includes other instructions 120. Increasing program order 122 is represented by a downward arrow. In the illustrated embodiment, the original program order 122 designates that the activation instruction 116 occurs before the enforcement instruction 118 in the program order. Moreover, the other instructions 120 occur after the enforcement instruction in the program order. If desired, one or more instructions (not shown) may optionally be included in the program order between the activation and enforcement instructions.

As shown in the illustration, the processor also includes an instruction order enforcement module 110. The instruction order enforcement module may be implemented in hardware (e.g., integrated circuitry, transistors or other circuit elements, etc.), firmware (e.g., microcode or other lower-level instructions stored in non-volatile memory), software (e.g., higher-level instructions stored in memory), or a combination thereof (e.g., hardware potentially combined with one or more of firmware and/or software).

In some embodiments, the instruction order enforcement module 110, in response to the pair of the instruction order enforcement instructions 114, may be operable to prevent the other instructions 120 occurring after the enforcement instruction 118 in the program order 122, from being processed prior to the activation instruction 116, in the out-of-order execution portion 106 of the processor 100. The pair of instructions may cause or result in the processor enforcing an instruction ordering constraint on instructions or operations issued before and after the pair of instructions. In some embodiments, the activation instruction 116 may be operable to activate the instruction order enforcement at a given pipeline stage, such as, for example, a stage in the in-order front end 104. Different ways of activating the instruction order enforcement are contemplated and will be described further below. In some embodiments, the enforcement instruction 118 may be operable to enforce the instruction order at a given pipeline stage, such as, for example, a stage in the in-order front end 104. For example, in some embodiments, the enforcement instruction may be held up in a queue in the give pipeline stage and thereby be prevented, as well as preventing the other newer instructions 120, from advancing through the pipeline beyond the given pipeline stage. Sometime later the instruction order enforcement may be deactivated and then the enforcement instructions and the other newer instructions may continue to advance through the pipeline. Advantageously, this may help to enforce instruction ordering, for example, which may be useful to order accesses to memory locations or other resources.

As previously mentioned, in some embodiments, the activation and enforcement instructions may represent instructions of an instruction set of the processor. Advantageously, by using two instructions of the instruction set (i.e., instruction set level instructions), there is no need to perform the associated instruction ordering operations or functionalities in microcode. In one aspect, this may offer an advantage in a RISC processor and/or a processor that is not operable to use microcode (e.g., microinstructions or micro-operations) to perform the pair of instruction order enforcement instructions 114 (e.g., the processor may not use microcode or may only microcode in only a limited or restricted fashion that is not suitable for implementing the pair of instruction order enforcement instructions). However, the instructions may also optionally be used in CISC or other types of processors including processors that may optionally implement the pair of instruction order enforcement instructions in microcode. Moreover, the pair of instructions may allow a practitioner (e.g., a software programmer) or software to flexibly control the locations in a program or code of the pair of instructions to achieve desired instruction ordering.

In some embodiments, in contrast to certain types of instructions, such as compare and exchange and like instructions, which affect only a single semaphore, mutex, or shared variable, embodiments of the pair of instruction order enforcement instructions may allow ordering accesses to multiple, many, any number of memory addresses. In some embodiments, in contrast to certain memory fence or memory barrier instructions, embodiments of the pair of instruction order enforcement instructions may enforce order of multiple, many, or any number of different types of instructions, rather than just memory access instructions (e.g., memory loads, memory stores, memory loads and memory stores, etc.). Moreover, memory fences instructions typically just enforce order of access to memory. In contrast, embodiments of the instructions disclosed herein may enforce order of access to memory, as well as enforcing ordering for other things, such as, for example, accesses to registers, arithmetic operations, and/or time of processing instructions. In addition, embodiments of the instructions disclosed herein may enforce ordering in other situations that memory fence instructions are generally not able to enforce order in. As an example, consider an input/output (I/O) device that has two locations, a first location X and a second location Y. Writing X may allow Y to be read. Memory fence instructions may keep consistency between Y occurring some time after X, but not the reverse.

To avoid obscuring the description, a relatively simple processor has been shown and described. The processor may optionally include other well-known components found in processors. Examples of such components include, but are not limited to, a branch prediction unit, instruction and data caches, second or higher level caches, instruction and data translation lookaside buffers, prefetch buffers, a register renaming unit, an instruction scheduling unit, bus interface units, a retirement unit, other components included in processors, and various combinations thereof. There are literally numerous different combinations and configurations of components in processors, and embodiments are not limited to any particular combination or configuration. Embodiments may be included in processors have multiple cores, logical processors, or execution engines at least one of which is operable to process a pair of instruction order enforcement instructions as disclosed herein.

FIG. 2 is a block flow diagram of an embodiment of a method 226 in a processor of processing or performing an embodiment of a pair of instruction order enforcement instructions. In various embodiments, the method may be performed by a general-purpose processor, special-purpose processor, or other instruction processing apparatus or digital logic device. In some embodiments, the operations and/or method of FIG. 2 may be performed by and/or within the processor of FIG. 1. The components, features, and specific optional details described herein for the processor of FIG. 1 also optionally apply to the operations and/or method of FIG. 2. Alternatively, the operations and/or method of FIG. 2 may be performed by and/or within a similar or different processor. Moreover, the processor of FIG. 1 may perform operations and/or methods the same as, similar to, or different than those of FIG. 2.

The method includes receiving a pair of instruction order enforcement instructions, at block 227. In various aspects, the pair of instructions may be received at a processor or a portion thereof (e.g., an instruction fetch unit, an instruction cache, a decoder, etc.). In various aspects, the instruction may be received from an off-die source (e.g., from memory, an off-die interconnect, etc.), or from an on-die source (e.g., from an instruction cache). The pair of instruction order enforcement instructions may be part of an instruction set of a processor. In some embodiments, the pair of instruction order enforcement instructions may include an activation instruction, and an enforcement instruction. Commonly, the activation instruction may occur before the enforcement instruction in program order.

The method includes, in response to the pair of instruction order enforcement instructions, preventing instructions occurring after the enforcement instruction in the program order, from being processed prior to the activation instruction, in an out-of-order portion of the processor, at block 228. In some embodiments, this may include activating the instruction order enforcement, in response to the activation instruction, at a first stage of a pipeline of the processor (e.g., a stage in an in-order front end of the processor). In some embodiments, while the instruction order enforcement is activated, the method may include enforcing the instruction order by preventing the enforcement instruction, and the instructions occurring after the enforcement instruction in program order, from advancing beyond a second stage of the pipeline (e.g., a stage in an in-order front end of the processor). In some embodiments, the enforcement instruction may be held up in a queue (e.g., in the second stage of the pipeline) and may prevent the instructions after the enforcement instruction in program order from advancing around the enforcement instruction. Sometime later the instruction order enforcement may be deactivated and then the enforcement instruction and the instructions after the enforcement instruction may proceed through the pipeline.

The method has been shown and described in a relatively simple format, but operations may optionally be added to and/or removed from the method. For example, in other embodiments, the method may optionally include fetching the instructions, decoding the instructions, scheduling the instructions (e.g., scheduling the activation instruction out-of-order), executing the instructions, performing microarchitectural operations associated with executing the instructions (e.g., modifying one or more bits, programming or activating a counter, etc.), committing the instructions, etc.

Figure 3:
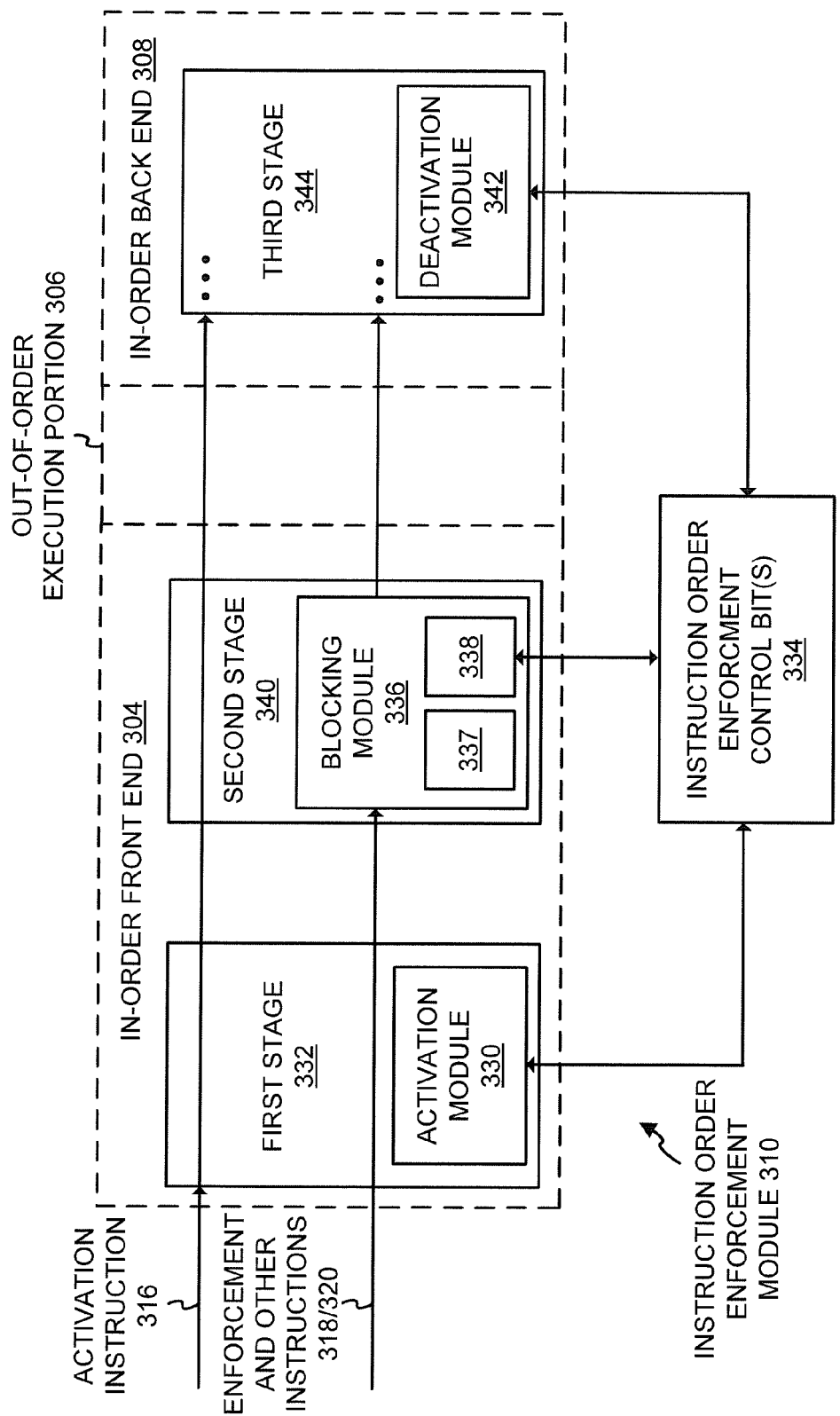
FIG. 3 is a block diagram of a first example embodiment of a suitable instruction order enforcement module.

FIG. 3 is a block diagram of a first example embodiment of a suitable instruction order enforcement module 310. In some embodiments, the instruction order enforcement module 310 may be included in the processor of FIG. 1 and/or may be used to perform the operation(s) or method of FIG. 2. Alternatively, the instruction order enforcement module 310 may be included in a similar or different processor and/or may be used to perform similar or different operations or methods. Moreover the processor of FIG. 1 may include a similar or different instruction order enforcement module that that of FIG. 3 and/or the operation(s) or method of FIG. 2 may be performed by a similar or different instruction order enforcement module that that of FIG. 3.

The instruction order enforcement module 310 includes an activation module 330. The activation module is operable to initiate or activate instruction order enforcement in response to an activation instruction 316 at a first stage 332 of a pipeline of the processor. As shown, in some embodiments, the first stage 332 may be within an in-order front end 304, although the scope of the invention is not so limited. By way of example, suitable examples of the first stage within the in-order front end include, but are not limited to, a fetch stage, a decode stage, and an allocate stage, or various points there between. Alternatively, other stages in the in-order front end, or another portion of the processor, may optionally be used. For example, the first stage may be an execute stage, a scheduling stage, or another stage. In some embodiments, the activation may be in the in-order front end and the deactivation may be in the in-order front end, the out-of-order section, or the in-order back end. If the pipeline stages used by the activation and enforcement instructions themselves do not guarantee enough order to avoid a deadlock scenario (e.g., if the activate and enforcement instructions get out of order in a way that would cause a problem), then some other mechanism may be included in the processor to provide a guarantee of enough order to avoid such deadlock scenarios.

In this first example embodiment, activation of the instruction order enforcement is through one or more instruction order enforcement control bits 334. As shown, the activation module may be coupled with the one or more control bits 334. In some embodiments, the activation module may be operable to modify or change the one or more control bits 334 from a first state (e.g., a starting binary value) to a second different state (e.g., a different binary value) to activate instruction order enforcement. As one particular example, the activation module may be operable to set a single bit to binary one to activate the instruction order enforcement, whereas the single bit may otherwise be cleared to binary zero when such instruction order enforcement is deactivated.

The instruction order enforcement module 310 also includes a blocking module 336. The blocking module is operable, in response to the activation and enforcement instructions, while the instruction order enforcement is activated, to enforce instruction order. In some embodiments, the blocking module may be operable to block or prevent the enforcement instruction, and other instructions occurring after the enforcement instruction in program order, from advancing beyond a second stage 340 of the pipeline. As shown, in some embodiments, the second stage may be at a separate stage than the activation module, and the blocking module may be coupled with the activation module. In other embodiments, the second stage and/or the blocking module may be at the same stage as the activation module. By way of example, suitable stages for the blocking module include, but are not limited to, a fetch stage, a decode stage, an allocate stage, a scheduling stage, an execute stage, and various points there between. Alternatively, other stages may optionally be used.

As shown, in this first example embodiment, the blocking module may include control bit checking logic 338 coupled with the control bits. The control bit checking logic and/or the blocking module may be operable to read or access the control bits to determine whether or not instruction order enforcement is currently activated. As further shown, in this first example embodiment, the blocking module may include instruction hold logic 337 (e.g., a queue, a multithreaded resource that is shared by instructions from two or more threads, etc.) that is operable to hold the enforcement instruction. In some embodiments, when it is determined that instruction order enforcement is activated, the instruction hold logic and/or the blocking module may be operable to hold the enforcement instruction at the second stage 340, and prevent the other instructions after the enforcement instruction in program order from advancing around the enforcement instruction and/or moving beyond the second stage. The pipelined execution for the thread having the activation and enforcement instructions, and the instructions after the enforcement instructions, may essentially stall or pause for a period of time. During this period of time, instructions from other threads may optionally be placed into the pipeline to take advantage of unused slots or pipeline stages.

In this first example embodiment, the instruction order enforcement module 310 may also include a deactivation module 342. In some embodiments, the deactivation module may be operable to deactivate instruction order enforcement, in response to the activation instruction 316, at third stage 344 of the pipeline. As shown, in some embodiments, the deactivation module may be coupled with the one or more instruction order enforcement control bits 334. In some embodiments, the deactivation module may change or modify the control bits 334 from the second state used to indicate activation to another state (e.g., the first state) used to indicate deactivation. As shown, in some embodiments, the third stage may be within an in-order back end 308, although the scope of the invention is not so limited. By way of example, suitable points in the in-order back end include, but are not limited to, a commit stage, a point after commit where a store is globally visible and is known to occur but has not yet actually occurred, a point after commit where the store has actually occurred, and various points there between. Alternatively, other points or stages in the processor pipeline may optionally be used. After the deactivation, the enforcement instruction and the other subsequent instructions in program order may be allowed to progress or advance through the pipeline. As another option, in some embodiments, the enforcement instruction may thereafter be treated as a non-operation (NOP) at either the second stage or a subsequent stage.

FIG. 4 is a block diagram of a second example embodiment of a suitable instruction order enforcement module 410. In some embodiments, the instruction order enforcement module 410 may be included in the processor of FIG. 1 and/or may be used to perform the operation(s) or method of FIG. 2. Alternatively, the instruction order enforcement module 410 may be included in a similar or different processor and/or may be used to perform similar or different operations or methods. Moreover the processor of FIG. 1 may include a similar or different instruction order enforcement module that that of FIG. 4 and/or the operation(s) or method of FIG. 2 may be performed by a similar or different instruction order enforcement module that that of FIG. 4.

The instruction order enforcement module 410 includes an activation module 430. The activation module is operable to initiate or activate instruction order enforcement in response to an activation instruction 416 at a first stage 432 of a pipeline of the processor. As shown, in some embodiments, the first stage 432 may be within an in-order front end 404, although the scope of the invention is not so limited. By way of example, suitable examples of the first stage within the in-order front end include, but are not limited to, a fetch stage, a decode stage, and an allocate stage, or various points there between. Alternatively, other stages in the in-order front end, or another portion of the processor, may optionally be used. For example, the first stage may be an execute stage, a scheduling stage, or another stage.

In this second embodiment, activation of the instruction order enforcement is through an instruction order enforcement counter 448. As shown, the activation module 430 may be coupled with the counter 448. In some embodiments, the activation module may be operable to activate or initiate the counter to start counting to a given or predetermined value in order to activate instruction order enforcement. By way of example, the counter may either count up from an initial value (e.g., zero) to a given or predetermined stopping value, or down from an initial, given, or predetermined value to a stopping value (e.g., zero). In some embodiments, a given or predetermined value may be fixed or constant for the activation instruction (e.g., fixed for an opcode of the activation instruction, not capable of being specified or changed by the activation instruction, determinable based on a decoder decoding the opcode, etc.). In other embodiments, the activation instruction may have an operand to explicitly specify the value to be used for the counter, or otherwise indicate the value to be used for the counter (e.g., may have one or more bits to select from a number of predetermined values). Advantageously, this may allow a programmer or software to program the counter with a flexible value that is appropriate for the particular implementation.

The instruction order enforcement module 410 also includes a blocking module 436. The blocking module is operable, in response to the activation and enforcement instructions, while the instruction order enforcement is activated, to enforce instruction order. In some embodiments, the blocking module may be operable to block or prevent the enforcement instruction, and other instructions occurring after the enforcement instruction in program order, from advancing beyond a second stage 440 of the pipeline. As shown, in some embodiments, the second stage may be at a separate stage than the activation module, and the blocking module may be coupled with the activation module. In other embodiments, the second stage and/or the blocking module may be at the same stage as the activation module. By way of example, suitable stages for the blocking module include, but are not limited to, a fetch stage, a decode stage, an allocate stage, a scheduling stage, an execute stage, and various points there between. Alternatively, other stages may optionally be used.

As shown, in this second embodiment, the blocking module may include counter check logic 438 that is coupled with the counter 448. The counter check logic and/or the blocking module may be operable to read, check, or access the counter to determine whether or not instruction order enforcement is currently activated. Alternatively, the counter may be configured to signal the blocking module to indicate whether or not instruction order enforcement is currently activated. As further shown, in this first example embodiment, the blocking module may include instruction hold logic 437 (e.g., a queue, a multithreaded resource that is shared by instructions from two or more threads, etc.) that is operable to hold the enforcement instruction. In some embodiments, when it is determined that instruction order enforcement is activated, the instruction hold logic and/or the blocking module may be operable to hold the enforcement instruction at the second stage 440, and prevent the other instructions after the enforcement instruction in program order from advancing around the enforcement instruction and/or moving beyond the second stage.

In this second embodiment, instruction order enforcement may be deactivated automatically upon the counter counting to the given or predetermined value. After deactivation, the enforcement instruction and the other subsequent instructions may be allowed to progress or advance through the pipeline (e.g., through an out-of-order execution portion 406 and an in-order back end 408). As another option, in some embodiments, the enforcement instruction may thereafter optionally be treated as a non-operation (NOP) at either the second stage or a subsequent stage of the pipeline.

Figure 5A:
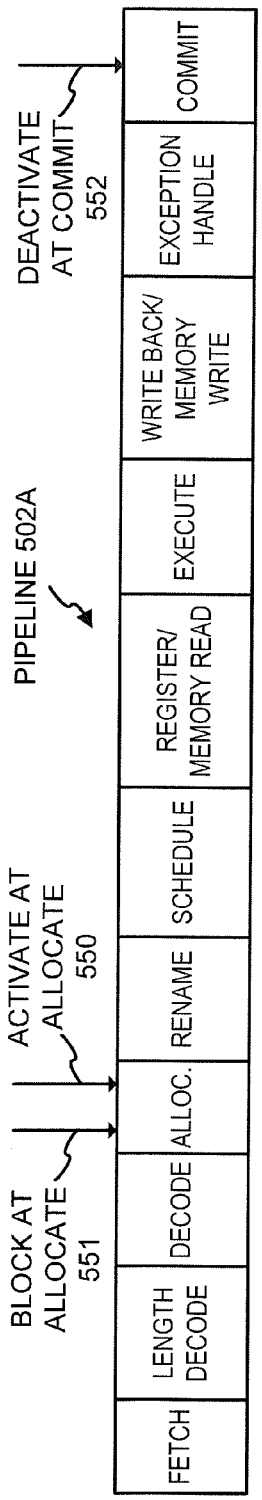
FIG. 5A-C are block diagrams illustrating several embodiments of suitable pipeline stages to implement activation, enforcement, and deactivation of instruction ordering.
Figure 5B:
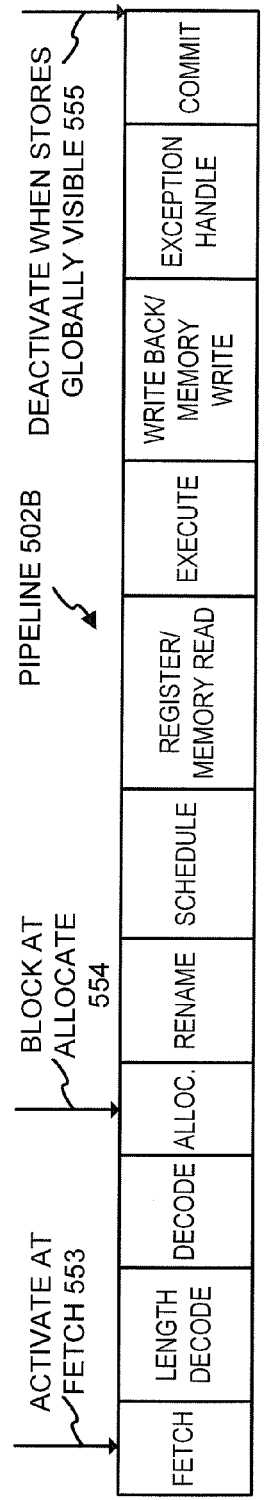
Figure 5C:
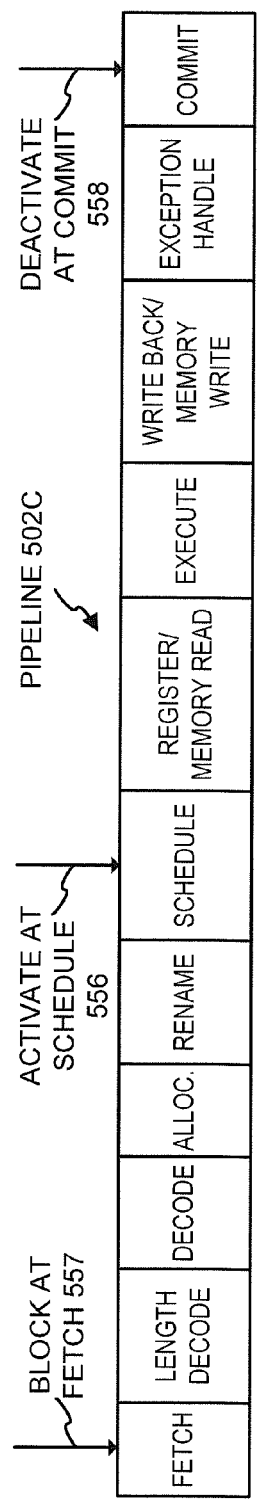

FIG. 5A-C are block diagrams illustrating several embodiments of suitable pipeline stages to implement activation, enforcement, and deactivation of instruction ordering. In these diagrams, pipeline stages, shown from left to right, include fetch, length decode, decode, allocate (alloc.), rename, schedule, register/memory read, execute, write back/memory write, exception handle, and commit. These particular pipeline stages are not required. Any other pipeline stages known in the arts should generally be suitable.

FIG. 5A illustrates an embodiment of a pipeline 502A where activation 550 of instruction ordering is at the allocate stage, enforcement or blocking 551 of the instruction ordering is also at the allocate stage, and deactivation 552 of instruction ordering is at the commit stage. FIG. 5B illustrates an embodiment of a pipeline 502B where activation 553 of instruction ordering is at the fetch stage, enforcement or blocking 554 of the instruction ordering is at the allocate stage, and deactivation 555 of instruction ordering is at the commit stage at a point where stores are globally visible. FIG. 5C illustrates an embodiment of a pipeline 502C where activation 556 of instruction ordering is at the schedule stage, enforcement or blocking 557 of the instruction ordering is at the fetch stage, and deactivation 558 of instruction ordering is at the commit stage. It is to be appreciated that these are just a few illustrative embodiments. Those skilled in the art and having the benefit of the present disclosure will appreciate that various other pipeline stages and/or combinations of pipeline stages may alternatively be used.

Figure 6:
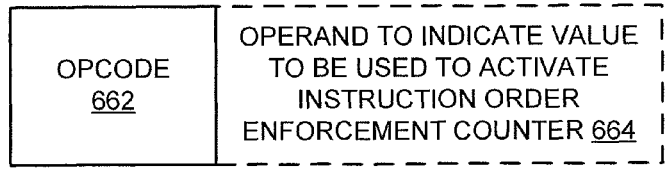
FIG. 6 is a block diagram of a first embodiment of a suitable activation instruction format.

FIG. 6 is a block diagram of a first embodiment of a suitable activation instruction format 660. The activation instruction format includes an operation code or opcode 662. The opcode may represent a plurality of bits or one or more fields that are operable to identify the instruction and/or the operation to be performed. In some embodiment, the activation instruction format may also optionally include one or more operands 664 to specify or otherwise indicate a value to be used to activate an instruction order enforcement counter. The one or more operands may include one or more fields or bits. In some embodiments, the one or more operands may explicitly specify or otherwise indicate the value directly within the instruction. For example, an immediate (e.g., a 4-bit or 8-bit immediate) may explicitly specify the value or select one of multiple predetermined values. In some embodiments, the value may represent a number of clock cycles to count, although the scope of the invention is not so limited. In other embodiments, the one or more operands may indicate one or more registers or other storage locations that are used to store the value. In still other embodiments, the register or other storage location having the value may be implicit to the instruction instead of needing to be specified.

Figure 7A:
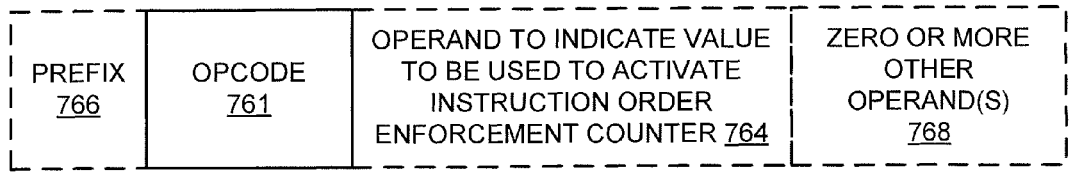
FIG. 7A is a block diagram of a second embodiment of a suitable activation instruction format.

FIG. 7A is a block diagram of a second embodiment of a suitable activation instruction format 760. In some embodiments, the activation instruction format may optionally include a prefix 766 to indicate that the instruction is an activation instruction to activate instruction order enforcement. The activation instruction format also includes an operation code or opcode 761. In some embodiments, the opcode may identify an instruction and/or an operation to be performed that is other than activating instruction order enforcement, which is the function of the prefix. Rather, by way of example, the opcode may indicate arithmetic, logical, memory access, or other type of instruction/operation (e.g., a packed multiplication operation, a logical shift operation, etc.). In some embodiments, the prefix may be added to various different types of arithmetic, logical, memory access, or other instructions and/or opcodes in order to add the instruction order activation functionality and make the instructions dual-purpose. In some embodiment, the activation instruction format may also optionally include one or more operands 764 to specify or otherwise indicate a value to be used to activate an instruction order enforcement counter. The various options previously described for FIG. 6 are also suitable for this embodiment. In some embodiments, for example depending upon the particular opcode, the activation instruction format may optionally include zero or more other operands 768 to implement the functionality and/or operation associated with the opcode.

Figure 7B:
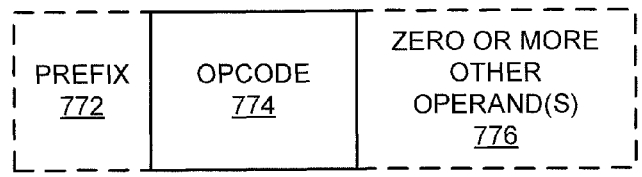
FIG. 7B is a block diagram of an embodiment of a suitable enforcement instruction format.

FIG. 7B is a block diagram of an embodiment of a suitable enforcement instruction format 770. In some embodiments, the enforcement instruction format may optionally include a prefix 772 to indicate that the instruction is an enforcement instruction to enforce instruction order. The enforcement instruction format also includes an operation code or opcode 774. In some embodiments, the opcode may identify an instruction and/or an operation to be performed that is other than enforcing instruction order, which is the function of the prefix. Rather, by way of example, the opcode may indicate arithmetic, logical, memory access, or other type of instruction/operation. In some embodiments, the prefix may be added to various different types of arithmetic, logical, memory access, or other instructions and/or opcodes in order to add the instruction order enforcement functionality and make the instructions dual-purpose. In some embodiments, for example depending upon the particular opcode, the enforcement instruction format may optionally include zero or more other operands 776 to implement the functionality and/or operation associated with the opcode.

It is to be appreciated that the formats of FIG. 6 and FIGS. 7A-B are just a few examples of suitable formats. Other suitable instruction formats may optionally add additional operands, fields, etc. Moreover, the illustrated order/arrangement of the fields and is not required, but rather the fields may optionally be rearranged, broken into multiple fields, fields may be combined, etc. Additionally, fields need not include contiguous sequences of bits, but rather may include non-contiguous or separated bits.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

Figures 8A, 8B:
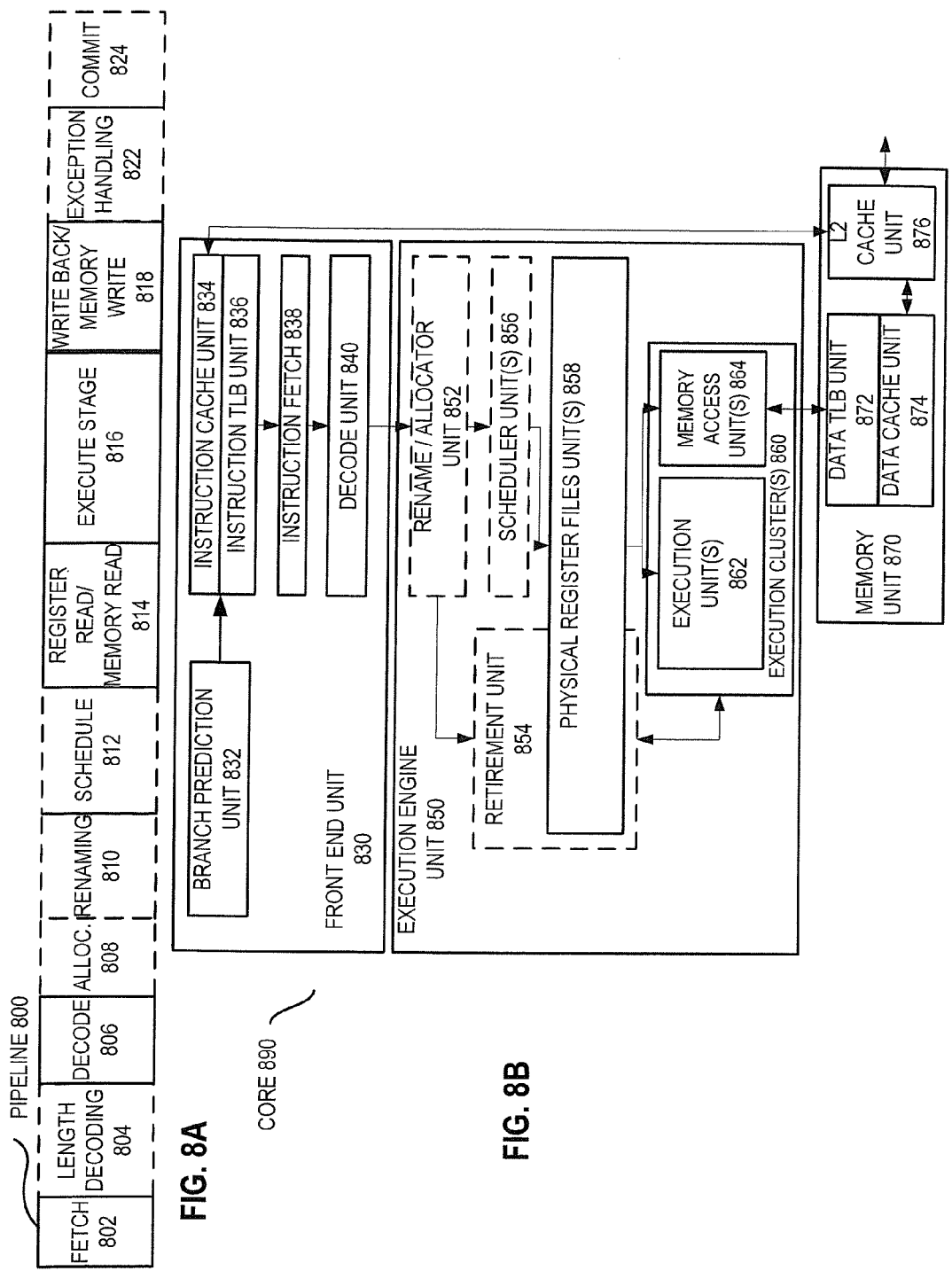
FIG. 8A is a block diagram illustrating both an exemplary in-order pipeline and an exemplary register renaming, out-of-order issue/execution pipeline according to embodiments of the invention.
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. The register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 9B:
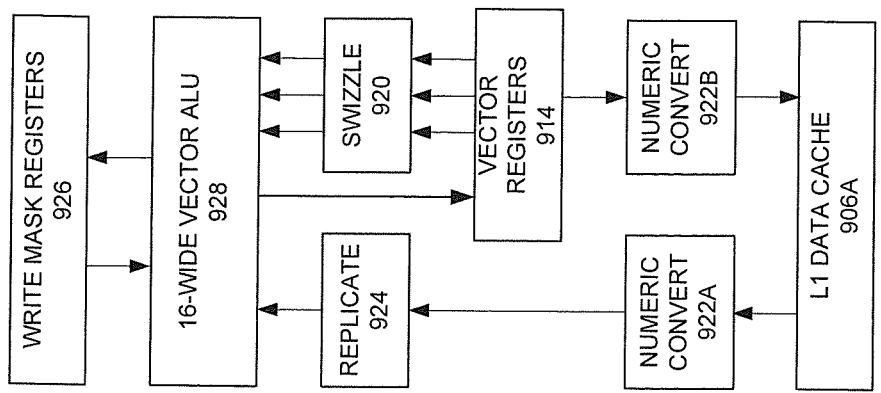
FIG. 9B is an expanded view of part of the processor core in FIG. 9A according to embodiments of the invention.
Figure 9A:
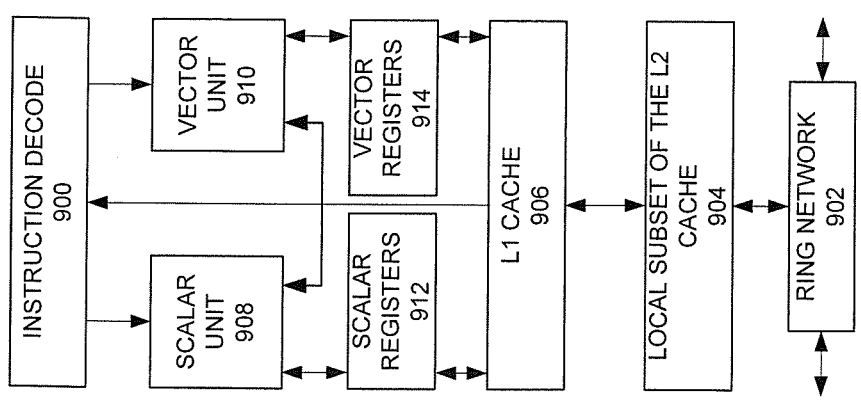
FIG. 9A is a block diagram of a single processor core, along with its connection to the on-die interconnect network and with its local subset of the Level 2 (L2) cache, according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
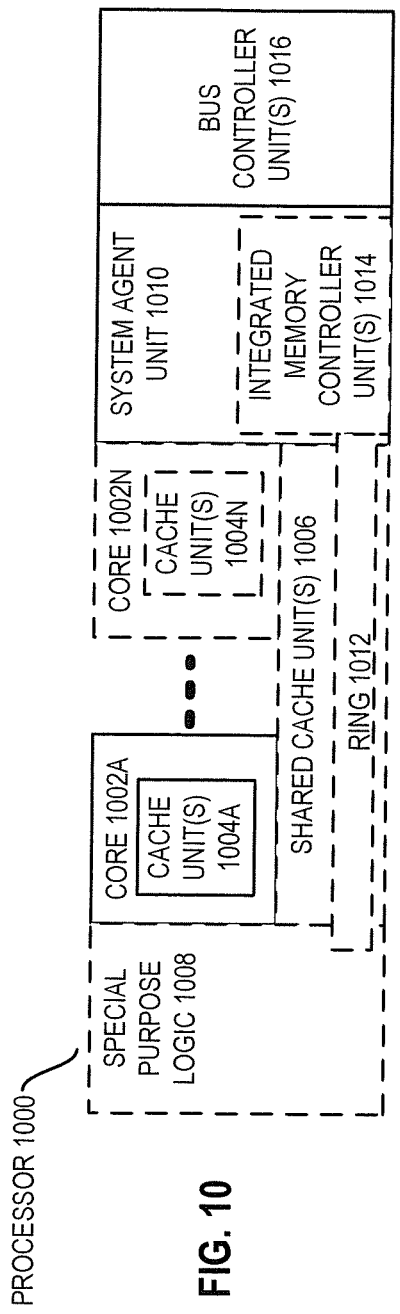
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
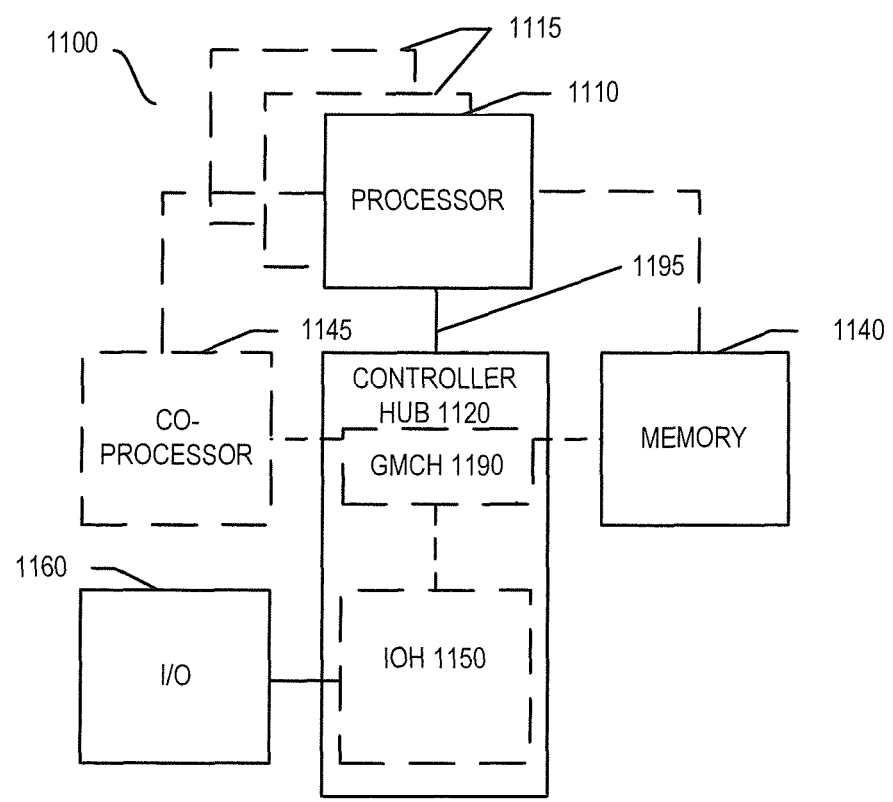
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
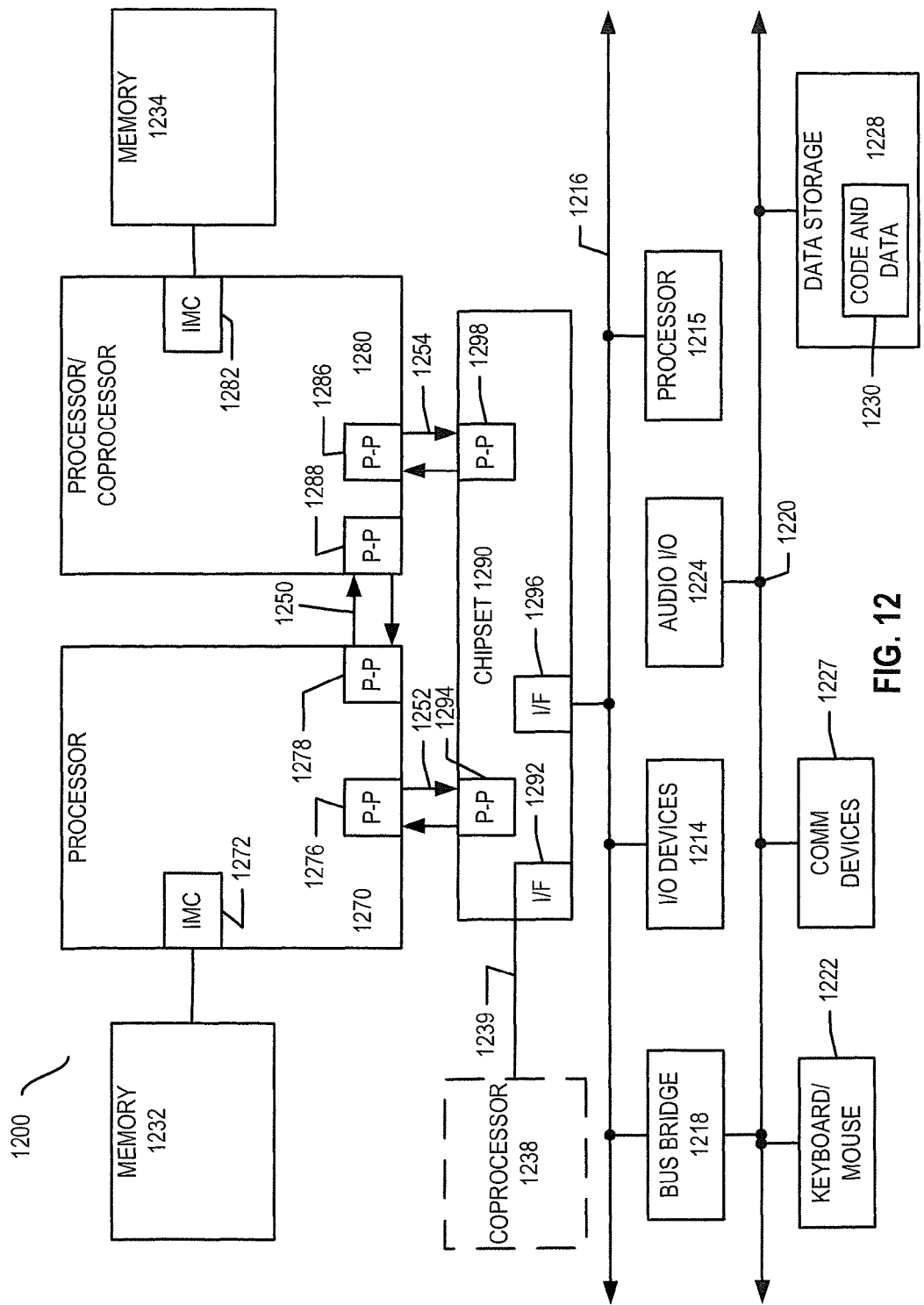
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
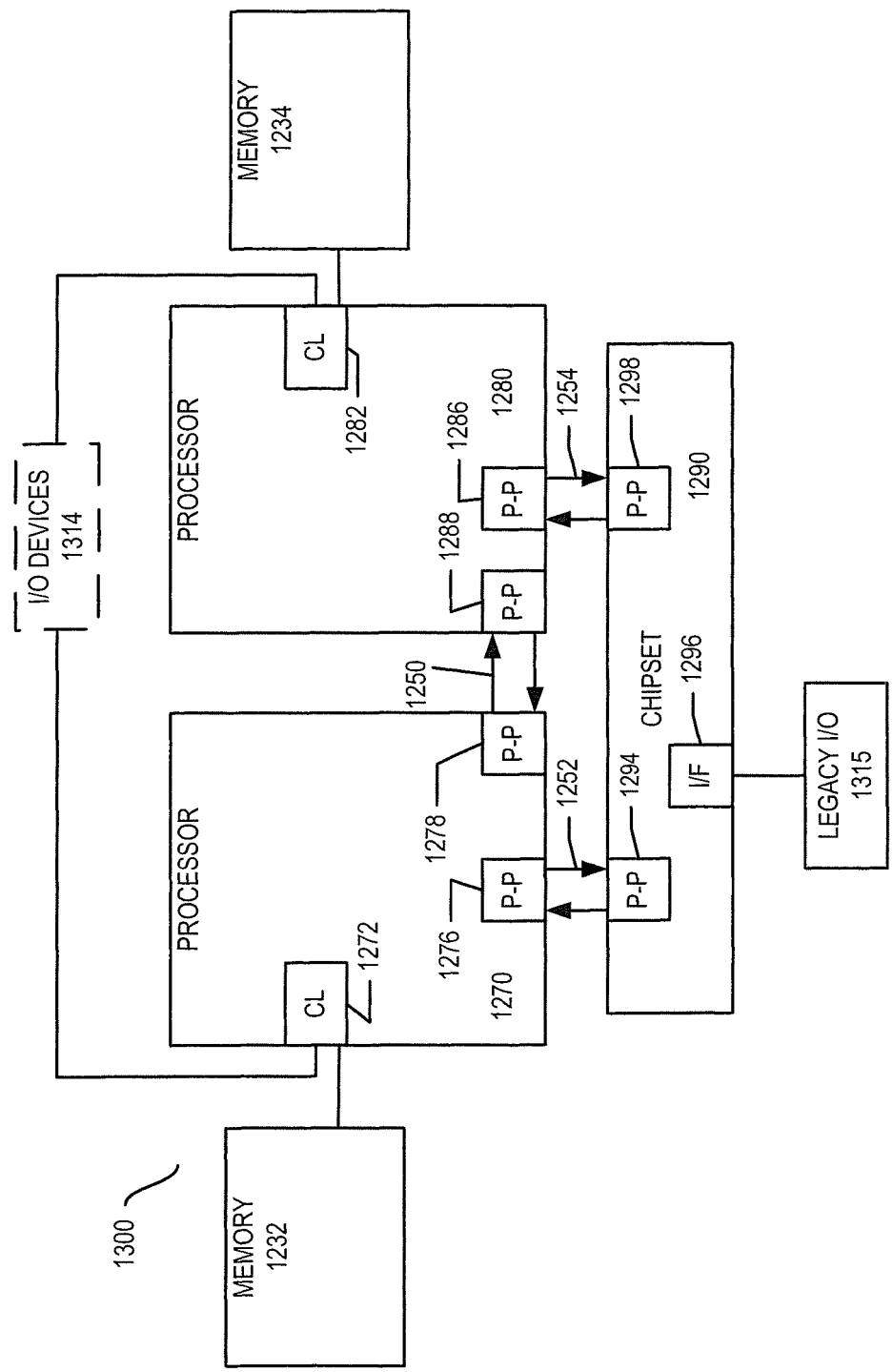
FIG. 13 shown is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
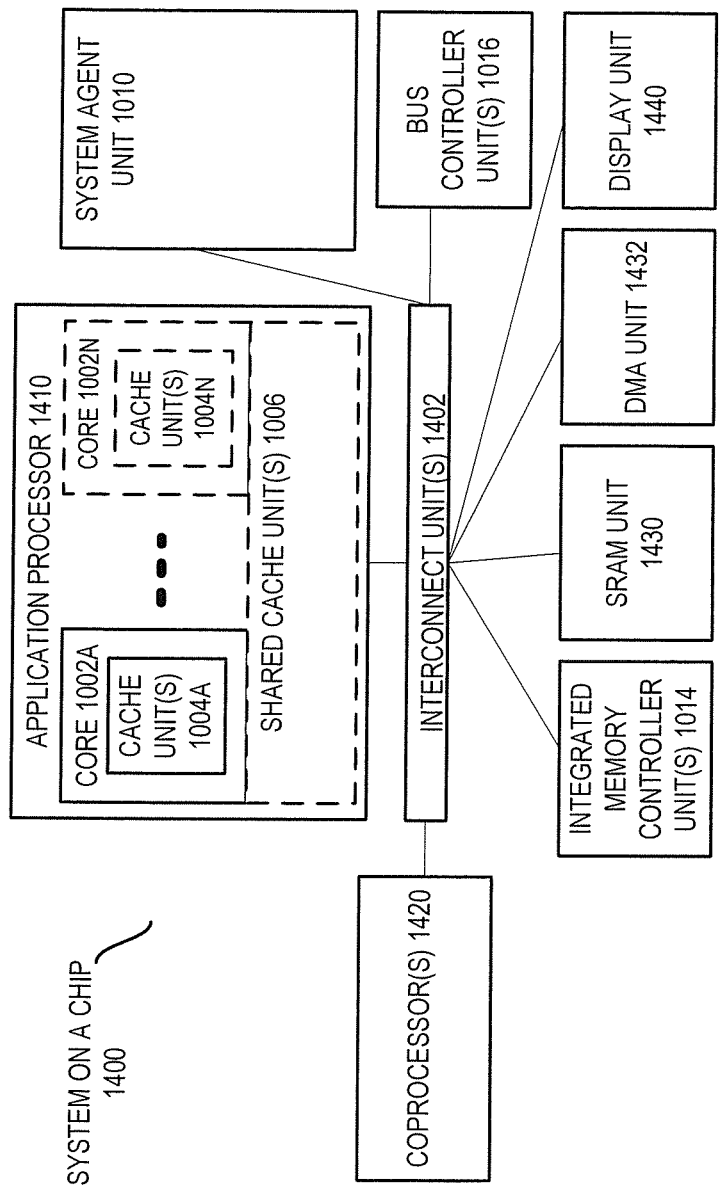
FIG. 14 shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of FIGS. 3, 4, 5A-C, 6, and 7A-B may also optionally be used in any of FIGS. 1 and 2. Moreover, components, features, and details described herein for any of the apparatus may also optionally be used in any of the methods described herein, which in embodiments may be performed by and/or with such the apparatus.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a first unit or component may be coupled with a second unit or component through one or more intervening units or components. In the figures, arrows are used to show connections and couplings.

In the description and claims, the term "logic" may have been used. As used herein, logic may include hardware, firmware, software, or various combinations thereof. Examples of logic include integrated circuitry, application specific integrated circuits, analog circuits, digital circuits, programmed logic devices, memory devices including instructions, etc. In some embodiments, hardware logic may include transistors and/or gates potentially along with other circuitry components. In some embodiments, the logic may be embodied as a component, unit, or other module.

In the description above, specific details have been set forth in order to provide a thorough understanding of the embodiments. However, other embodiments may be practiced without some of these specific details. The scope of the invention is not to be determined by the specific examples provided above but only by the claims below. In other instances, well-known circuits, structures, devices, and operations have been shown in block diagram form or without detail in order to avoid obscuring the understanding of the description. In some cases, where multiple components have been shown and described, they may be incorporated into one component. In some cases, where a single component has been shown and described, it may be separated into two or more components.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In another embodiment, the machine-readable medium may include a transitory machine-readable communication medium, for example, the electrical, optical, acoustical or other forms of propagated signals, such as carrier waves, infrared signals, digital signals, or the like.

Examples of suitable machines include, but are not limited to, general-purpose processors, special-purpose processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor that includes an instruction fetch unit to fetch a pair of instruction order enforcement instructions. The pair of instruction order enforcement instructions are to be part of an instruction set of the processor. The pair of instruction order enforcement instructions are to include an activation instruction and an enforcement instruction. The activation instruction is to occur before the enforcement instruction in a program order. The processor also includes an instruction order enforcement module that, in response to the pair of the instruction order enforcement instructions, is to prevent instruction occurring after the enforcement instruction in the program order, from being processed prior to the activation instruction, in an out-of-order portion of the processor.

Example 2 includes the processor of Example 1 and optionally in which the instruction order enforcement module includes an activation module to activate instruction order enforcement, in response to the activation instruction, at a first stage of a pipeline of the processor. The processor also optionally includes a blocking module coupled with the activation module. The blocking module, while the instruction order enforcement is activated, is to prevent the enforcement instruction, and the instructions occurring after the enforcement instruction, from advancing beyond a second stage of the pipeline.

Example 3 includes the processor of Example 2 and optionally also including one or more instruction order enforcement control bits of the processor. The activation module is to change the one or more instruction order enforcement control bits from a first state to a second state to activate the instruction order enforcement. Optionally, the blocking module is to hold the enforcement instruction at the second stage, and is to prevent the instructions after the enforcement instruction from advancing around the enforcement instruction, while the bits have the second state. The processor may optionally also include a deactivation module to change the one or more instruction order enforcement control bits to deactivate the instruction order enforcement, in response to the activation instruction, at a third stage of a pipeline of the processor.

Example 4 includes the processor of Example 2 and optionally also including an instruction order enforcement counter coupled with the activation module. The activation module is to activate the instruction order enforcement counter to start counting to a value to activate the instruction order enforcement. Optionally, the blocking module may be operable to hold the enforcement instruction at the second stage, and may be operable to prevent the instructions after the enforcement instruction from advancing around the enforcement instruction, until the counter counts to the value.

Example 5 includes the processor of Example 4 and optionally in which the activation instruction is to include an operand to indicate the value to be used to activate the instruction order enforcement counter.

Example 6 includes the processor of Example 2 and optionally in which the activation module is to activate the instruction order enforcement in an in-order front end of the pipeline. Optionally, the blocking module may prevent the enforcement instruction, and the instructions occurring after the enforcement instruction, from advancing beyond the second stage of the in-order front end of the pipeline. The processor may also optionally include a deactivation module to deactivate the instruction order enforcement, in response to the activation instruction, in an in-order back end of the pipeline.

Example 7 includes the processor of Example 6 and optionally in which the activation module is to activate the instruction order enforcement at one of a fetch stage and an allocate stage, The blocking module is optionally to prevent the enforcement instruction, and the instructions occurring after the enforcement instruction, from advancing beyond one of the fetch and the allocate stages. The deactivation module is optionally to deactivate the instruction order enforcement, after the activation instruction reaches a commit stage.

Example 8 includes the processor of any preceding example and optionally in which a prefix of the activation instruction may indicate activation of instruction order enforcement and in which besides activation of instruction order enforcement the activation instruction is to also indicate at least one other operation. Optionally, a prefix of the enforcement instruction may indicate instruction order enforcement and in which besides instruction order enforcement the enforcement instruction is to also indicate at least one other operation.

Example 9 includes the processor of any preceding example and optionally in which the processor includes a reduced instruction set computing (RISC) processor.

Example 10 includes the processor of any preceding example and optionally in which the processor is not operable to use microcode to implement the pair of instruction order enforcement instructions.

Example 11 is a method performed by a processor. The method includes receiving a pair of instruction order enforcement instructions, which are part of an instruction set of a processor. The pair of instruction order enforcement instructions include an activation instruction, and an enforcement instruction. The activation instruction occurs before the enforcement instruction in a program order. In response to the pair of the instruction order enforcement instructions, the method includes preventing instructions occurring after the enforcement instruction in the program order, from being processed prior to the activation instruction, in an out-of-order portion of the processor.

Example 12 includes the method of Example 11 and optionally also including activating the instruction order enforcement, in response to the activation instruction, at a first stage of a pipeline of the processor. The method also optionally includes while the instruction order enforcement is activated, enforcing the instruction order by preventing the enforcement instruction, and the instructions occurring after the enforcement instruction, from advancing beyond a second stage of the pipeline.

Example 13 includes the method of Example 12 and optionally in which activating includes changing one or more instruction order enforcement control bits of the processor from a first state to a second state. Optionally, enforcing the instruction order includes holding the enforcement instruction at the second stage, and preventing the instructions after the enforcement instruction from advancing around the enforcement instruction. The method optionally also includes deactivating the instruction order enforcement, in response to the activation instruction, at a third stage of the pipeline, in which deactivating the instruction order enforcement includes changing the one or more instruction order enforcement control bits.

Example 14 includes the method of Example 12 and optionally in which activating includes activating an instruction order enforcement counter to start counting to a value. Optionally, enforcing the instruction order may include holding the enforcement instruction at the second stage, and preventing the instructions after the enforcement instruction from advancing around the enforcement instruction, until the instruction order enforcement counter counts to the value.

Example 15 includes the method of Example 14 and optionally in which receiving the pair of instructions includes receiving an activation instruction that includes an operand to indicate the value that is used to activate the instruction order enforcement counter.

Example 16 includes the method of Example 12 and optionally in which activating includes activating the instruction order enforcement in an in-order front end of the pipeline. Optionally, enforcing the instruction order may include preventing the enforcement instruction, and the instructions after the enforcement instruction, from advancing beyond the second stage, of the in-order front end of the pipeline. The method may also optionally include deactivating the instruction order enforcement, in response to the activation instruction, in an in-order back end of the pipeline.

Example 17 includes the method of Example 16 and optionally in which activating includes activating the instruction order enforcement at one of a fetch stage and an allocate stage. Optionally, the preventing the enforcement instruction, and the instructions after the enforcement instruction, from advancing beyond the second stage may include preventing advancement beyond one of the fetch and the allocate stages. Optionally, deactivating may include deactivating the instruction order enforcement after the activation instruction reaches a commit stage.

Example 18 includes the method of Example 11 and optionally also including determining based on a prefix that the activation instruction is to activate the instruction order enforcement. Besides the activation of the instruction order enforcement, the activation instruction may also indicate at least one other operation selected. The method may also optionally include determining based on a prefix that the enforcement instruction is to enforce the instruction order. Besides the enforcing of the instruction order, the enforcement instruction may also indicate at least one other operation.

Example 19 includes the method of any preceding example and optionally in which receiving the pair of the instruction order enforcement instructions includes receiving the pair of the instruction order enforcement instructions at a reduced instruction set computing (RISC) processor.

Example 20 includes the method of any preceding example and optionally in which receiving the pair of the instruction order enforcement instructions includes receiving the pair of the instruction order enforcement instructions at a processor that is not operable to use microcode to implement the pair of instruction order enforcement instructions.

Example 21 includes a system to process instructions. The system includes an interconnect, a processor coupled with the interconnect, and a dynamic random access memory (DRAM) coupled with the interconnect. The DRAM is to store a pair of instruction order enforcement instructions, which are part of an instruction set of the processor. The pair of instruction order enforcement instructions includes an activation instruction and an enforcement instruction. The activation instruction occurs before the enforcement instruction in a program order. The pair of instruction order enforcement instructions, if executed by the processor, are operable to cause the processor to perform operations including preventing instructions occurring after the enforcement instruction in the program order, from being processed prior to the activation instruction, in an out-of-order portion of the processor.

Example 22 includes the system of Example 21 and optionally in which the pair of instruction order enforcement instructions, if executed by the processor, are operable to cause the processor to perform operations including activating the instruction order enforcement, in response to the activation instruction, at a first stage of a pipeline of the processor. Optionally, while the instruction order enforcement is activated, the system may enforce the instruction order by preventing the enforcement instruction, and the instructions occurring after the enforcement instruction, from advancing beyond a second stage of the pipeline.

Example 23 includes an article of manufacture including a non-transitory machine-readable storage medium storing a pair of instruction order enforcement instructions, which are part of an instruction set of a processor. The pair of instruction order enforcement instructions includes an activation instruction, and an enforcement instruction. The activation instruction occurs before the enforcement instruction in a program order. The pair of instruction order enforcement instructions if processed by the processor is operable to cause the processor to perform operations including preventing instructions occurring after the enforcement instruction in the program order, from being processed prior to the activation instruction, in an out-of-order portion of the processor.

Example 24 includes the article of manufacture of Example 23 and optionally in which the pair of instruction order enforcement instructions, if executed by the processor, are operable to cause the processor to perform operations including activating the instruction order enforcement, in response to the activation instruction, at a first stage of a pipeline of the processor. Optionally, while the instruction order enforcement is activated, further including enforcing the instruction order by preventing the enforcement instruction, and the instructions occurring after the enforcement instruction, from advancing beyond a second stage of the pipeline.

Example 25 is a processor that includes means for receiving a pair of instruction order enforcement instructions, which are part of an instruction set of a processor. The pair of instruction order enforcement instructions includes an activation instruction, and an enforcement instruction. The activation instruction occurs before the enforcement instruction in a program order. The processor also includes means for preventing instructions occurring after the enforcement instruction in the program order, from being processed prior to the activation instruction, in an out-of-order portion of the processor, in response to the pair of the instruction order enforcement instructions.

Example 26 includes the processor of Example 25 and optionally also including means for activating the instruction order enforcement, in response to the activation instruction, at a first stage of a pipeline of the processor.

Example 27 includes a machine-readable storage medium storing instructions that if executed by a machine are to cause the machine to perform the method of any of Examples 11-20.

Example 28 includes a processor to perform the method of any of Examples 11-20.

Example 29 includes a processor including means for performing the method of any of Examples 11-20.

Example 30 includes a processor including integrated circuitry and/or logic and/or components and/or units, or any combination, to perform the method of any of Examples 11-20.

Example 31 includes a computer system including a processor and optionally a dynamic random access memory (DRAM) coupled with the processor, the computer system to perform the method of any of Examples 11-20.

Example 32 includes a processor to perform one or more operations or a method substantially as described herein.

Example 33 includes a processor including means for performing one or more operations or a method substantially as described herein.

Example 34 includes a processor to perform a pair of instructions substantially as described herein.

Example 35 includes a processor including means for performing a pair of instructions substantially as described herein.

What is claimed is:

1. A processor comprising:
   an instruction fetch unit to fetch a pair of instruction order enforcement instructions, which are to be part of an instruction set of the processor, the pair of instruction order enforcement instructions to include an activation instruction and an enforcement instruction, the activation instruction to occur before the enforcement instruction in a program order; and
   an instruction order enforcement module, in response to the pair of the instruction order enforcement instructions, to prevent instructions occurring after the enforcement instruction in the program order, from being processed prior to the activation instruction, in an out-of-order portion of the processor.

2. The processor of claim 1, wherein the instruction order enforcement module comprises:
   an activation module to activate instruction order enforcement, in response to the activation instruction, at a first stage of a pipeline of the processor; and
   a blocking module coupled with the activation module, the blocking module, while the instruction order enforcement is activated, to prevent the enforcement instruction, and the instructions occurring after the enforcement instruction, from advancing beyond a second stage of the pipeline.

3. The processor of claim 2:
   further comprising one or more instruction order enforcement control bits of the processor;
   wherein the activation module is to change the one or more instruction order enforcement control bits from a first state to a second state to activate the instruction order enforcement;
   wherein the blocking module is to hold the enforcement instruction at the second stage, and is to prevent the instructions after the enforcement instruction from advancing around the enforcement instruction, while the bits have the second state; and
   further comprising a deactivation module to change the one or more instruction order enforcement control bits to deactivate the instruction order enforcement, in response to the activation instruction, at a third stage of a pipeline of the processor.

4. The processor of claim 2:
   further comprising an instruction order enforcement counter coupled with the activation module;
   wherein the activation module is to activate the instruction order enforcement counter to start counting to a value to activate the instruction order enforcement; and
   wherein the blocking module is to hold the enforcement instruction at the second stage, and is to prevent the instructions after the enforcement instruction from advancing around the enforcement instruction, until the counter counts to the value.

5. The processor of claim 4, wherein the activation instruction is to comprise an operand to indicate the value to be used to activate the instruction order enforcement counter.

6. The processor of claim 2:
   wherein the activation module is to activate the instruction order enforcement in an in-order front end of the pipeline;
   wherein the blocking module is to prevent the enforcement instruction, and the instructions occurring after the enforcement instruction, from advancing beyond the second stage of the in-order front end of the pipeline; and further comprising a deactivation module to deactivate the instruction order enforcement, in response to the activation instruction, in an in-order back end of the pipeline.

7. The processor of claim 6:

wherein the activation module is to activate the instruction order enforcement at one of a fetch stage and an allocate stage;

wherein the blocking module is to prevent the enforcement instruction, and the instructions occurring after the enforcement instruction, from advancing beyond one of the fetch and the allocate stages; and wherein the deactivation module is to deactivate the instruction order enforcement, after the activation instruction reaches a commit stage.

8. The processor of claim 1, wherein at least one of:

a prefix of the activation instruction is to indicate activation of instruction order enforcement, and wherein besides activation of instruction order enforcement the activation instruction is to also indicate at least one other operation; and a prefix of the enforcement instruction is to indicate instruction order enforcement, and wherein besides instruction order enforcement the enforcement instruction is to also indicate at least one other operation.

9. The processor of claim 1, wherein the processor comprises a reduced instruction set computing (RISC) processor.

10. The processor of claim 1, wherein the processor is not operable to use microcode to implement the pair of instruction order enforcement instructions.

11. A method performed by a processor comprising:

receiving a pair of instruction order enforcement instructions, which are part of an instruction set of a processor, the pair of instruction order enforcement instructions including an activation instruction, and an enforcement instruction, the activation instruction occurring before the enforcement instruction in a program order; and in response to the pair of the instruction order enforcement instructions, preventing instructions occurring after the enforcement instruction in the program order, from being processed prior to the activation instruction, in an out-of-order portion of the processor.

12. The method of claim 11, further comprising:

activating the instruction order enforcement, in response to the activation instruction, at a first stage of a pipeline of the processor; and while the instruction order enforcement is activated, enforcing the instruction order by preventing the enforcement instruction, and the instructions occurring after the enforcement instruction, from advancing beyond a second stage of the pipeline.

13. The method of claim 12:

wherein activating comprises changing one or more instruction order enforcement control bits of the processor from a first state to a second state;

wherein enforcing the instruction order comprises holding the enforcement instruction at the second stage, and preventing the instructions after the enforcement instruction from advancing around the enforcement instruction; and further comprising deactivating the instruction order enforcement, in response to the activation instruction, at a third stage of the pipeline, wherein deactivating the instruction order enforcement comprises changing the one or more instruction order enforcement control bits.

14. The method of claim 12:

wherein activating comprises activating an instruction order enforcement counter to start counting to a value; and wherein enforcing the instruction order comprises holding the enforcement instruction at the second stage, and preventing the instructions after the enforcement instruction from advancing around the enforcement instruction, until the instruction order enforcement counter counts to the value.

15. The method of claim 14, wherein receiving the pair of instructions comprises receiving an activation instruction that comprises an operand to indicate the value that is used to activate the instruction order enforcement counter.

16. The method of claim 12:

wherein activating comprises activating the instruction order enforcement in an in-order front end of the pipeline;

wherein enforcing the instruction order comprises preventing the enforcement instruction, and the instructions after the enforcement instruction, from advancing beyond the second stage, of the in-order front end of the pipeline; and further comprising deactivating the instruction order enforcement, in response to the activation instruction, in an in-order back end of the pipeline.

17. The method of claim 16:

wherein activating comprises activating the instruction order enforcement at one of a fetch stage and an allocate stage;

wherein preventing the enforcement instruction, and the instructions after the enforcement instruction, from advancing beyond the second stage comprises preventing advancement beyond one of the fetch and the allocate stages; and wherein deactivating comprises deactivating the instruction order enforcement after the activation instruction reaches a commit stage.

18. The method of claim 11, further comprising at least one of:

determining based on a prefix that the activation instruction is to activate the instruction order enforcement, wherein, besides the activation of the instruction order enforcement, the activation instruction also indicates at least one other operation selected; and determining based on a prefix that the enforcement instruction is to enforce the instruction order, wherein, besides the enforcing of the instruction order, the enforcement instruction also indicates at least one other operation.

19. The method of claim 11, wherein receiving the pair of the instruction order enforcement instructions comprises receiving the pair of the instruction order enforcement instructions at a reduced instruction set computing (RISC) processor.

20. The method of claim 11, wherein receiving the pair of the instruction order enforcement instructions comprises receiving the pair of the instruction order enforcement instructions at a processor that is not operable to use microcode to implement the pair of instruction order enforcement instructions.

21. A system to process instructions comprising:

an interconnect;

a processor coupled with the interconnect; and a dynamic random access memory (DRAM) coupled with the interconnect, the DRAM storing a pair of instruction order enforcement instructions, which are part of an instruction set of the processor, the pair of instruction order enforcement instructions including an activation instruction and an enforcement instruction, the activation instruction occurring before the enforcement instruction in a program order, the pair of instruction order enforcement instructions, if executed by the processor, operable to cause the processor to perform operations comprising:

preventing instructions occurring after the enforcement instruction in the program order, from being processed prior to the activation instruction, in an out-of-order portion of the processor.

22. The system of claim 21, wherein the pair of instruction order enforcement instructions, if executed by the processor, are operable to cause the processor to perform operations comprising:
   activating the instruction order enforcement, in response to the activation instruction, at a first stage of a pipeline of the processor; and
   while the instruction order enforcement is activated, enforcing the instruction order by preventing the enforcement instruction, and the instructions occurring after the enforcement instruction, from advancing beyond a second stage of the pipeline.

23. An article of manufacture comprising a non-transitory machine-readable storage medium, the machine-readable storage medium storing a pair of instruction order enforcement instructions, which are part of an instruction set of a processor, the pair of instruction order enforcement instructions including an activation instruction, and an enforcement instruction, the activation instruction occurring before the enforcement instruction in a program order, the pair of instruction order enforcement instructions if processed by the processor operable to cause the processor to perform operations comprising:
   preventing instructions occurring after the enforcement instruction in the program order, from being processed prior to the activation instruction, in an out-of-order portion of the processor.

24. The article of manufacture of claim 23, wherein the pair of instruction order enforcement instructions, if executed by the processor, are operable to cause the processor to perform operations comprising:
   activating the instruction order enforcement, in response to the activation instruction, at a first stage of a pipeline of the processor; and
   while the instruction order enforcement is activated, enforcing the instruction order by preventing the enforcement instruction, and the instructions occurring after the enforcement instruction, from advancing beyond a second stage of the pipeline.

* * * * *